United States Patent
Glatfelter et al.

(10) Patent No.: US 10,636,308 B2
(45) Date of Patent: Apr. 28, 2020

(54) SYSTEMS AND METHODS FOR COLLISION AVOIDANCE

(71) Applicant: THE BOEING COMPANY, Chicago, IL (US)

(72) Inventors: John William Glatfelter, West Chester, PA (US); David Lee Howick, Buckley, WA (US)

(73) Assignee: THE BOEING COMPANY, Chicago, IL (US)

( * ) Notice: Subject to any disclaimer, the term of this patent is extended or adjusted under 35 U.S.C. 154(b) by 150 days.

(21) Appl. No.: 15/158,160

(22) Filed: May 18, 2016

(65) Prior Publication Data

US 2017/0337820 A1 Nov. 23, 2017

(51) Int. Cl.
*G08G 1/16* (2006.01)
*B66F 9/075* (2006.01)
(Continued)

(52) U.S. Cl.
CPC .......... *G08G 1/164* (2013.01); *B66F 9/0755* (2013.01); *B66F 9/24* (2013.01); *B66F 17/003* (2013.01);
(Continued)

(58) Field of Classification Search
CPC ....... G08G 1/096716; G08G 1/096741; G08G 1/0133; G08G 1/0141; G08G 1/096755; G08G 1/164
(Continued)

(56) References Cited

U.S. PATENT DOCUMENTS

| 7,232,236 B2 | 6/2007 | Vitense et al. | |
| 2002/0163444 A1* | 11/2002 | Budnovitch | B60Q 1/48 340/932.2 |

(Continued)

FOREIGN PATENT DOCUMENTS

| JP | 2010277123 | 12/2010 |
| JP | 2015125669 | 7/2015 |

(Continued)

OTHER PUBLICATIONS

Combined Search and Examination Report for Application No. GB1707668.8 dated Sep. 26, 2017, 10 pgs.
(Continued)

*Primary Examiner* — Alexander G Kalinowski
*Assistant Examiner* — Sanjeev Malhotra
(74) *Attorney, Agent, or Firm* — Moore IP Law (57) ABSTRACT

Systems and methods for collision avoidance include a plurality of sensors respectively disposed on a plurality of movable objects, wherein each sensor is configured to transmit signals indicating the location of the movable object. The system further includes a receiver configured to receive the transmitted signals and a controller in communication with the receiver. The controller is configured to monitor the received signals from the plurality of sensors indicating the locations of the movable objects to determine a direction of travel of each movable object based on locations of the movable objects over time. The controller is further configured to determine an intersection region of the direction of travel of at least two movable objects and generate an output signal to provide an alert at the intersection region of the at least two movable objects, when at least one movable object is within a predetermined proximity of the intersection region.

20 Claims, 9 Drawing Sheets

(51) Int. Cl.
  *B66F 17/00* (2006.01)
  *B66F 9/24* (2006.01)
  *G06K 9/00* (2006.01)
  *G06K 9/32* (2006.01)

(52) U.S. Cl.
  CPC ......... *G06K 9/00771* (2013.01); *G08G 1/166* (2013.01); *G06K 9/00362* (2013.01); *G06K 9/3233* (2013.01)

(58) Field of Classification Search
  USPC ........... 701/431, 2, 20; 340/932.2, 435, 902; 250/215; 342/107; 700/275
  See application file for complete search history.

(56) References Cited

U.S. PATENT DOCUMENTS

| | | | | |
|---|---|---|---|---|
| 2009/0108182 | A1* | 4/2009 | Thiebaud | H04N 5/913 250/215 |
| 2011/0093134 | A1* | 4/2011 | Emanuel | G05D 1/0289 701/2 |
| 2012/0025964 | A1* | 2/2012 | Beggs | B60Q 1/2673 340/435 |
| 2012/0025965 | A1* | 2/2012 | Mochizuki | B60Q 9/008 340/435 |
| 2013/0054032 | A1* | 2/2013 | El-Essawy | G01D 21/00 700/275 |
| 2014/0005929 | A1* | 1/2014 | Gale | G08G 1/096775 701/431 |
| 2014/0210643 | A1* | 7/2014 | Baker | G08G 1/0965 340/902 |
| 2016/0046308 | A1* | 2/2016 | Chung | B61L 23/041 701/20 |
| 2016/0097849 | A1* | 4/2016 | Nichols | G01S 13/91 342/107 |
| 2016/0211974 | A1* | 7/2016 | Komano | H04L 63/06 |
| 2016/0339934 | A1* | 11/2016 | Chung | B61L 27/04 |
| 2017/0369288 | A1* | 12/2017 | Fulton | B25J 9/1676 |

FOREIGN PATENT DOCUMENTS

| | | | | |
|---|---|---|---|---|
| WO | WO 2016070193 A1 | * | 5/2016 | ............ B60W 40/09 |
| WO | WO-2016070193 A1 | * | 5/2016 | ............ B60W 40/09 |

OTHER PUBLICATIONS

"Collision Avoidance Systems;" MH165_Collision Avoidance Brochure; 2015; Magnetek Material Handling.
Japanese Office Action for Application No. 2017-093889 dated Mar. 5, 2019, 7pgs.
UK Examination Report for Application No. GB1707668.8 dated Oct. 17, 2019, 3 pgs.

* cited by examiner

IF *DIST* > *(R1+R2)*... WE HAVE A COLLISION

FIG. 6A

TABLE DRIVEN IMPLEMENTATION OF MOMENTUM EQUATIONS

| MASS (WEIGHT IN LBS) | | SAFETY RADIUS (R) IN FEET | VELOCITY FACTOR | EXAMPLE OBJECTS |
|---|---|---|---|---|
| LOWER RANGE | UPPER RANGE | | | |
| 10 | 500 | 5.0 | 1 | PERSON |
| 501 | 1000 | 7.5 | 2 | TOOLING FIXTURE |
| 1001 | 5000 | 10.0 | 3 | SMALL ASSEMBLY |
| 5001 | 10,000 | 12.0 | 4 | FORKLIFT |
| 10,001 | --- | 15.0 | 5 | ENGINE OR LARGE ASSEMBLY |

SYSTEMS AND METHODS FOR COLLISION AVOIDANCE

BACKGROUND

The present disclosure relates in general to systems and methods for collision avoidance, particularly in a factory or large building environment.

Cranes, forklift trucks, automated equipment, robots, and other hazards within a building, such as a factory, can have a direct impact on the health and safety of individuals within the building. Environments with a high-density of large parts, tooling, and assembly equipment pose a particularly difficult safety challenge because of the associated momentum of the larger objects, which can lead to potential near misses with individuals or other objects in the building, and in some cases, could result in impact with the individuals.

Human reaction time is limited by the human speed to process the warnings and complexity of things known and things that can be seen and heard. This process is challenging, for example, in a factory environment due to noise reduction devices (e.g., ear plugs, music headphones, etc.) and also limited by line-of-sight threats.

Thus, individuals who work in manufacturing facilities, industrial yards, warehouses, and outdoor storage facilities in the proximity of industrial equipment are challenged with daily safety concerns. It would be desirable to identify and warn these individuals of potential conditions that could result in impact of the individual with a moving object.

SUMMARY

In various embodiments, a system for collision avoidance is provided that includes a plurality of sensors respectively disposed on a plurality of movable objects, wherein each sensor is configured to transmit signals indicating the location of the movable object on which the sensor is disposed. The system further includes a receiver configured to receive the transmitted signals and a controller in communication with the receiver. The controller is configured to monitor the received signals from the plurality of sensors indicating the locations of the movable objects to determine a direction of travel of each movable object based on locations of the movable objects over time. The controller is further configured to determine an intersection region of the direction of travel of at least two movable objects and generate an output signal to provide an alert at the intersection region of the at least two movable objects, when at least one movable object is within a predetermined proximity of the intersection region.

In various embodiments, a method for collision avoidance is provided that includes wirelessly transmitting, from each of a plurality of sensors respectively disposed on a plurality of movable objects within a building, signals indicating the location of the movable object on which each sensor is disposed and monitoring, with a controller, the signals from the plurality of sensors indicating the locations of the movable objects. The method also includes determining, by the controller, a direction of travel of each movable object based on each a location of the object over time and determining, by the controller, an intersection region of the direction of travel of at least two movable objects. The method further includes generating an output signal when at least one movable object is within a predetermined proximity of the intersection region, to provide an alert at the intersection region of the at least two movable objects.

In various embodiments, an anticipatory collision avoidance system is provided that includes a plurality of sensors respectively disposed on a plurality of movable objects, wherein each sensor is configured to transmit signals indicating the location of the movable object on which the sensor is disposed. The anticipatory collision avoidance system further includes a controller configured to monitor the transmitted signals from the plurality of sensors indicating the locations of the movable objects. The controller is configured to anticipate a possible collision of two or more of the objects using two or more of mass information, position information, momentum information and stopping distances of the movable objects, and generate an alert when a possible collision is anticipated.

DETAILED DESCRIPTION

The following detailed description of certain embodiments will be better understood when read in conjunction with the appended drawings. To the extent that the figures illustrate diagrams of the functional blocks of various embodiments, the functional blocks are not necessarily indicative of the division between hardware circuitry, between software elements or between hardware and software implementations. Thus, for example, one or more of the functional blocks may be implemented in a single piece of hardware or multiple pieces of hardware. Similarly, the software programs may be stand-alone programs, may be incorporated as subroutines in an operating system, and the like. It should be understood that the various embodiments are not limited to the arrangements and instrumentality shown in the drawings.

Various embodiments provide systems and methods for collision avoidance, particularly anticipatory collision avoidance with dynamic safety marking projections. More specifically, the systems and methods described herein include a plurality of sensors for use in inhibiting or preventing collision between objects in a facility. Thus, the systems and methods may be configured as a real-time warning safety system or device for a factory environment.

One or more systems can include one or more devices that can be disposed on (e.g., coupled to) moving objects in a factory (e.g., cranes, fork lifts trucks, etc.), such as by providing a bolt-on capability to large moving objects in the factory. The devices are then operated to provide anticipatory collisions avoidance, such as to improve the welfare of people within the factory. Alternatively or additionally, one or more devices can be configured as a personal wearable device (e.g., an armband, a smart soft-hat, etc.) that travels with individuals as a safety advisor within the factory. However, as should be appreciated, various embodiments provide flexibility in installation such that the devices can be mounted on different equipment, buildings, or wearable by individuals. In some embodiments, the system provides the capability for dynamic alerts, such as illuminated projections onto the factory floor.

In operation, one or more embodiments utilize a combination of positioning technology (e.g., centimeter-accurate GPS technology and RFID), sensor technology, collision avoidance systems/software, low energy projection device (s), and feedback technology that may include light, sound, and vibration. The various embodiments are configured to provide clear indications to all potentially affected individuals or identified individuals that a potentially dangerous situation is anticipated and to increase situational awareness.

Thus, as described in more detail below, various embodiments provide a real-time warning system with the ability to alert individuals (e.g., employees) of potential conditions or scenarios that are not in the line-of-sight of the individuals. Accordingly, the ability to sense and anticipate potential collisions is provided with the ability to notify of a potential dangerous condition (e.g., imminent danger). For example, in some embodiments, the system is configured to illuminate potentially dangerous areas on factory/warehouse floors (e.g., areas identified as areas where a potential collision could occur).

By practicing one or more embodiments, real-time warning is provided that aids the safety of individuals by anticipating and avoiding collisions in factory/shop environments, industrial yards, and warehouses, among other environments and settings. For example, various embodiments, anticipate collision of two objects hitting that might not have line-of-sight, which in various embodiments includes providing the anticipatory collision avoidance by anticipating one or more factors, including position information, momentum information and stopping distances.

It should be noted that while one or more embodiments may be described in connection with a particular environment, the embodiment(s) may be implemented or used in different environments. For example, one or more systems and methods described herein may be used in different manufacturing environments (e.g., aerospace, automotive, industrial plants), industrial warehouses (including forklifts, racks, and having poor visibility), industrial yards (having heavy equipment, trucks and forklifts) and outdoor storage areas (e.g., in airports, shipping docks, and automotive facilities), among others. For example, systems and methods described herein may be used for anticipatory collision avoidance in high-density factory environments or other complex factory environments.

Figure 1:
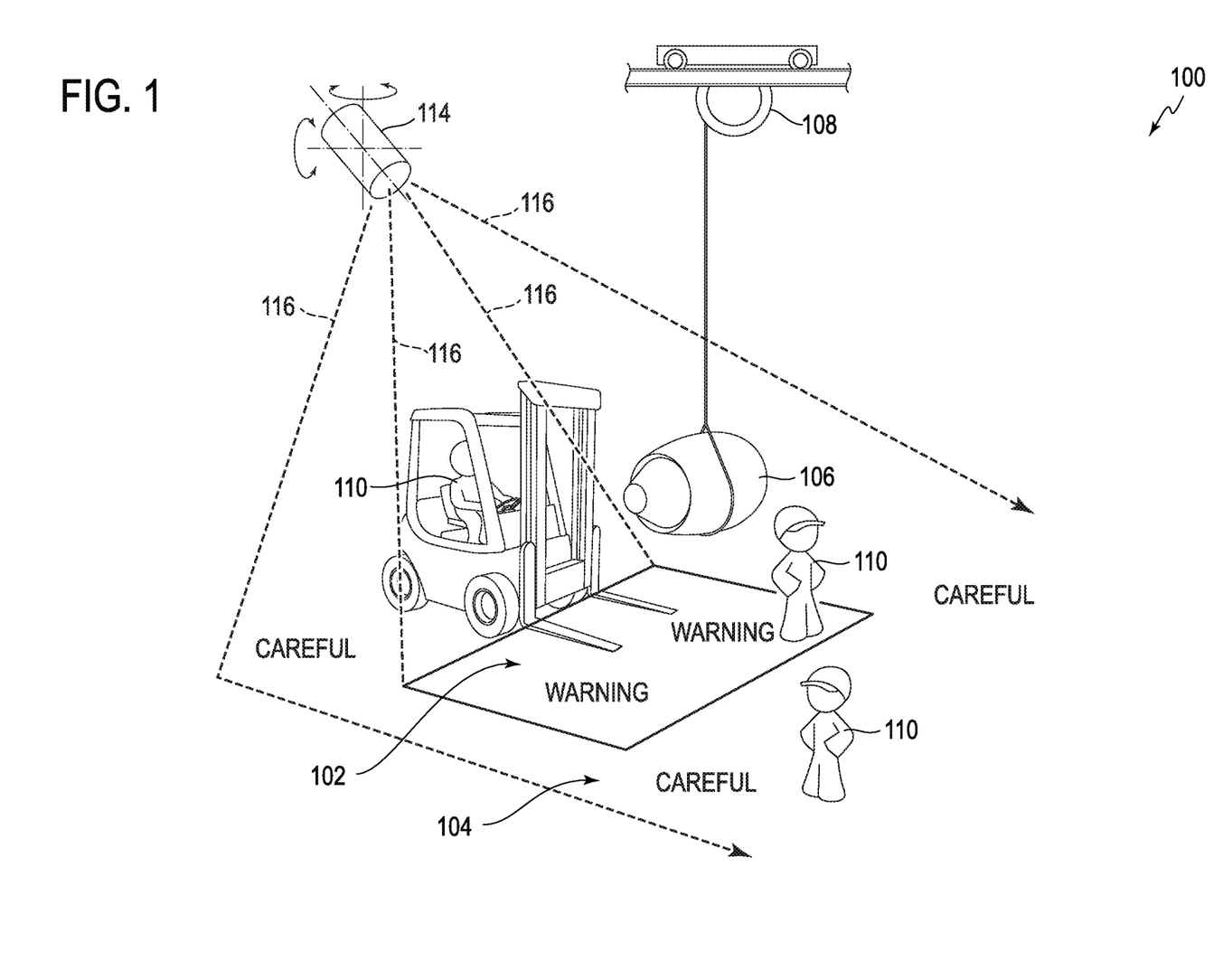
FIG. 1 is a diagram of a collision avoidance system.

As illustrated in FIG. 1, a collision avoidance system 100 is configured as a dynamic collision avoidance system. In the illustrated embodiment, the collision avoidance system 100 operates to provide dynamic warnings within one or more areas 102 and 104 of potential collision between a moving object 106 (illustrated as an engine being moved by an overhead crane 108) and one or more individuals 110 moving/operating equipment. For example, the individuals 110 may be working within the areas 102 and 104, including walking within the areas 102 and 104 or operating equipment, such as a forklift 112 that is within or may be heading towards one of the areas 102 and 104. The collision avoidance system 100 anticipates a possible collision within different areas, which may include providing warnings relative to large moving objects (having large inertia that can take some effort and time to slow down), which may also not be within the line-of-sight of the individuals 110. The collision avoidance system 100 in various embodiments provides warnings in situations even when the individuals 110 see the object 106, but might otherwise not be able to avoid impact with the object 106 without the anticipatory collision avoidance and guidance of the collision avoidance system 100. Thus, the collision avoidance system 100 provides anticipatory collision avoidance with respect to individuals 110 that are paying attention and individuals 110 that are not paying attention to their surrounding environment.

The areas 102 and 104 are determined by the collision avoidance system 100 as anticipated zones of concern or potential collision. The areas 102 and 104 may be determined to have different degrees of relative likelihood of potential collision, such that in the area 102 potential collision is greater than in the area 104. As such, different warnings (e.g., visual, tactile or audible warnings) may be provided based on the potential collision likelihood. For example, in the area 102 having a higher likelihood of potential collision, a high alert or warning may be provided, while in the area 104 having a lower likelihood of potential collision than the area 102, a lower alert or caution may be provided. For example, in the areas 102 and 104 a projected floor marking may be provided that includes a message that is differently colored, such as a red warning projection in the area 102 and a yellow careful projection in the area 104.

In various embodiments, a projection device 114 (e.g., a projector or illuminating device) is configured to project the messages (and/or other indicia or symbols) regarding the potential collision conditions in the areas 102 and 104. For example, the projection device 114 may be mounted to a wall or ceiling in the building and tracks or is caused to move the projection 116 as the object 106 moves. It should be noted that the size and shape of the areas 102 and 104 in which the projection 112 is provided may change, such as based one or more factors of the moving object 106 and the individuals 110, such as the mass and speed of each. Thus, the individuals 110 in the illustrated embodiment are able to view the moving projection 116 (e.g., moving floor marking) that provides a dynamic warning of a potential collision condition with the object 106.

Figure 2:
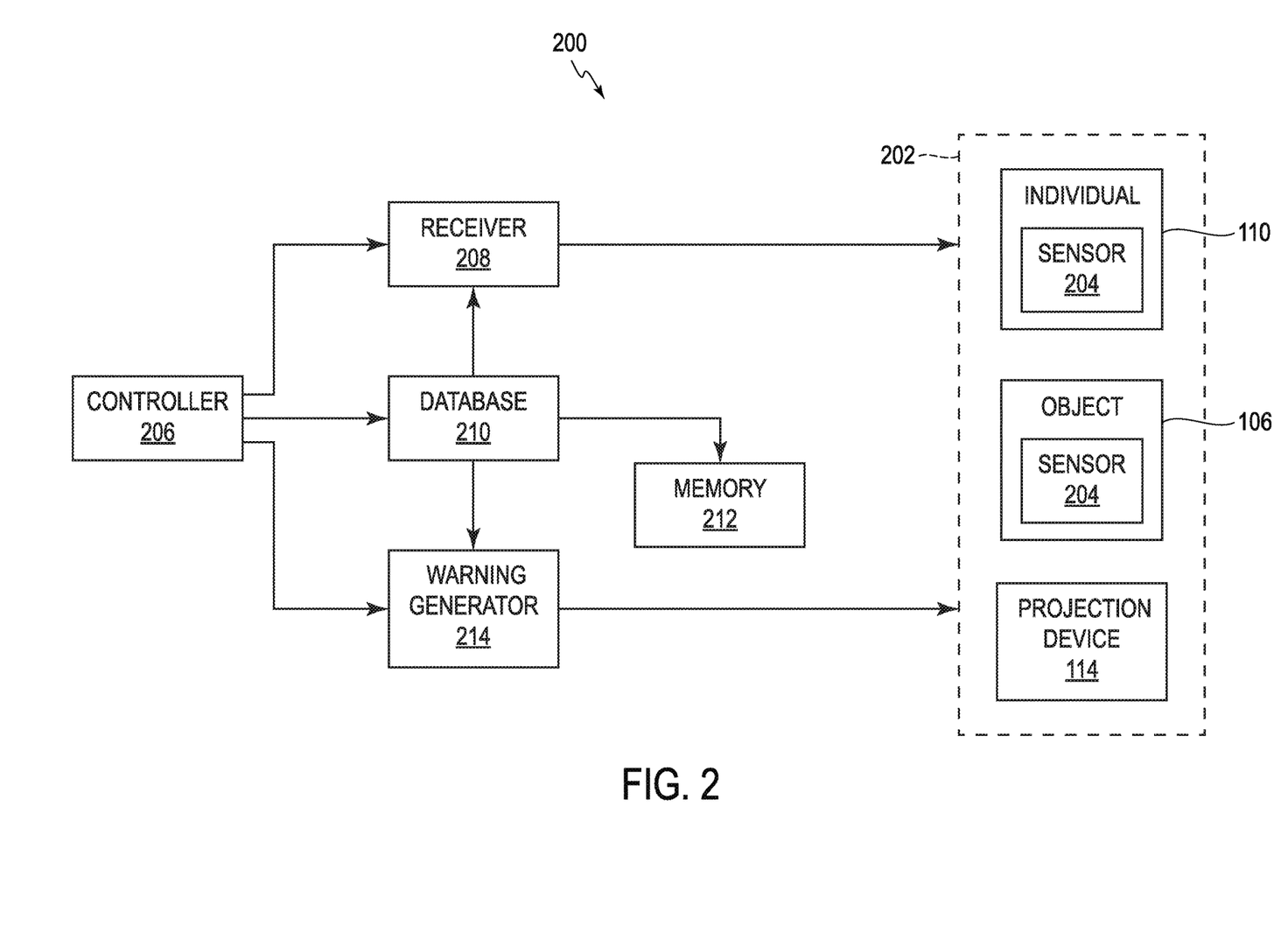
FIG. 2 is a block diagram of an anticipatory collision avoidance system.

An anticipatory collision avoidance system 200 that provides collision anticipation and warning, and which may be embodied as or form part of the collision avoidance system 100 (shown in FIG. 1) is illustrated in FIG. 2. It should be noted that like numerals represent like parts in the various Figures. The anticipatory collision avoidance system 200 is configured in various embodiments to inhibit, prevent or reduce the likelihood of collision between a plurality of movable objects in a facility 202, for example the object 106 and one or more individuals 110. It should be noted that although FIG. 2 illustrates one object 106 and one individual 110, multiple objects 106 and/or individuals 110 may be monitored with the anticipatory collision avoidance system 200.

The anticipatory collision avoidance system 200 includes a plurality of sensors 204 respectively disposed on a plurality of movable objects within the facility 202, such as coupled with the object 106 and the individual 110, which may be a removable coupling or a fixed coupling thereto. The plurality of sensors 204 are each configured to wirelessly transmit signals including or indicating the location of the movable object on which the sensor 204 is disposed. For example, in some embodiments, the sensors 204 include GPS and/or radio-frequency (RF) technology for use in determining location information.

The anticipatory collision avoidance system 200 further includes a controller 206 coupled with a receiver 208 (e.g., one or more wireless receivers). The controller 206 may be a processing device or processor (e.g., CPU) that is configured in one or more embodiments to monitor signals from the plurality of sensors 204 and locations of the movable objects (e.g., objects 106 and individuals 110) to determine a direction of travel of each movable object based on each movable object's location over time. In operation, as will be described in more detail herein, the controller 206 is configured to determine possible collision points or areas. For example, the controller 206 is configured to determine an intersection region (such as the areas 102 and 104 shown in FIG. 1) of the direction of travel of at least two movable objects and generate an output signal via a warning generator 214 to an alarm device, such as the projection device 114, to provide a visible alert (and or an audible or tactile alert with other alert devices) at the intersection region of the at least two movable objects, when at least one movable object is within a predetermined proximity of the intersection region, to thereby alert, for example, an operator of at least one movable object or an individual 110 for enabling collision avoidance therebetween.

In various embodiments, the anticipatory collision avoidance system 200 includes a database 210 that stores information relating to the objects or the facility 202, such as the size, shape, weight, etc. of the objects and the size or other characteristics (e.g., known landmarks) of the facility 202. In one embodiment, the contents of the database 210 are used in combination with the received location information to provide the anticipatory collision warnings. It should be noted that the data within the database 210 may be downloaded during initiation of a monitoring session across a communication link into a memory 212 (which may form part of one or more of the components shown in FIG. 2). In another embodiment, a copy of the data in the database 210 may be provided and maintained in a central computer system (not shown) that may be accessible by controller 206. In yet another embodiment, the data in the database 210 (or portions thereof) may be updated during the monitoring session from the central computer system.

In operation, the anticipatory collision avoidance system 200 may be configured to provide illuminated messages by the projection device 114, such as providing a flashing illuminating indicia at the intersection region of the movable objects. It should be noted that while the projection device 114 in FIG. 1 is shown in an overhead position, the projection device 114 may be positioned in different locations and multiple projection devices 114 may be provided. For example, the projection device 114 may be configured as a light emitting device disposed proximate to a floor pathway in the facility 202 for illuminating a portion of the floor pathway in response to the output signal, to provide warning indicia at the intersection region of the movable objects. The warning(s) reduce the likelihood of collisions within the facility 202 that might otherwise result from the limitations of the individuals 110 to properly assess the potential for impact with the object 106.

Thus, the anticipatory collision avoidance system 200 is configured to anticipate collision of multiple objects, which may include the object 106 and individual 110 that are not in line-of-sight of each other. In one or more embodiments, the anticipatory collision avoidance system 200 processes received location information and different factors, such as position, momentum and stopping distances to determine potential collision locations. For example, in various embodiments, the anticipatory collision avoidance system 200 is configured as a real-time warning system with the ability to alert individuals outside of scenarios that are not in the line-of-sight, the ability to sense and anticipate potential collisions, the ability to notify imminent danger and the ability to illuminate potentially dangerous areas on factory/warehouse floors. Additionally, the anticipatory collision avoidance system 200 allows for one or more components (e.g., sensors 204) to be coupled (e.g., mounted) on equipment, buildings, or wearable by the individual 110.

In one embodiment, the anticipatory collision avoidance system 200 includes as the sensors 106, one or more of a powered FLIR-type system and centimeter accurate hi-res GPS. The anticipatory collision avoidance system 200 performs environmental sampling, which may include receiving position information from continuous sensor readings, continuous GPS readings and computations and/or object recognition. The controller of the collision avoidance system 200 may be programmed with a control algorithm as will be described herein that senses the physical location (e.g., three-dimensional location) in proximity to the objects (such as the mass) and determines potential collisions using one or more collision threshold algorithms. Based on the determined potential collisions, one or more notifications are provided, such as light, sound and/or tactile/vibration notifications, among others.

The anticipatory collision avoidance system 200 may include as the projection device 114, a low energy projection device capable of emitting a lighted message of different colors. For example, the message and color may be varied based on the level, likelihood and how imminent is the existence of a potential collision.

It should be noted that the anticipatory collision avoidance system 200 may be configured in a combination of different hardware and/or software. For example, one or more components of the anticipatory collision avoidance system 200 may be embodied as a cyber-physical system (CPS) and/or middleware.

Additionally, the database 210 may include an image/pattern/symbol library that is used for object and projection patterns. For example, the database 210 may include different notifications that may be projected by the projection device 114. In some embodiments, the database 210 may include one or more flight path libraries that define one or possible paths that the object 106 can be moved to reduce or eliminate the likelihood of collisions or that would have a lesser likelihood of encountering other objects 106 or individuals 110.

Figure 3:
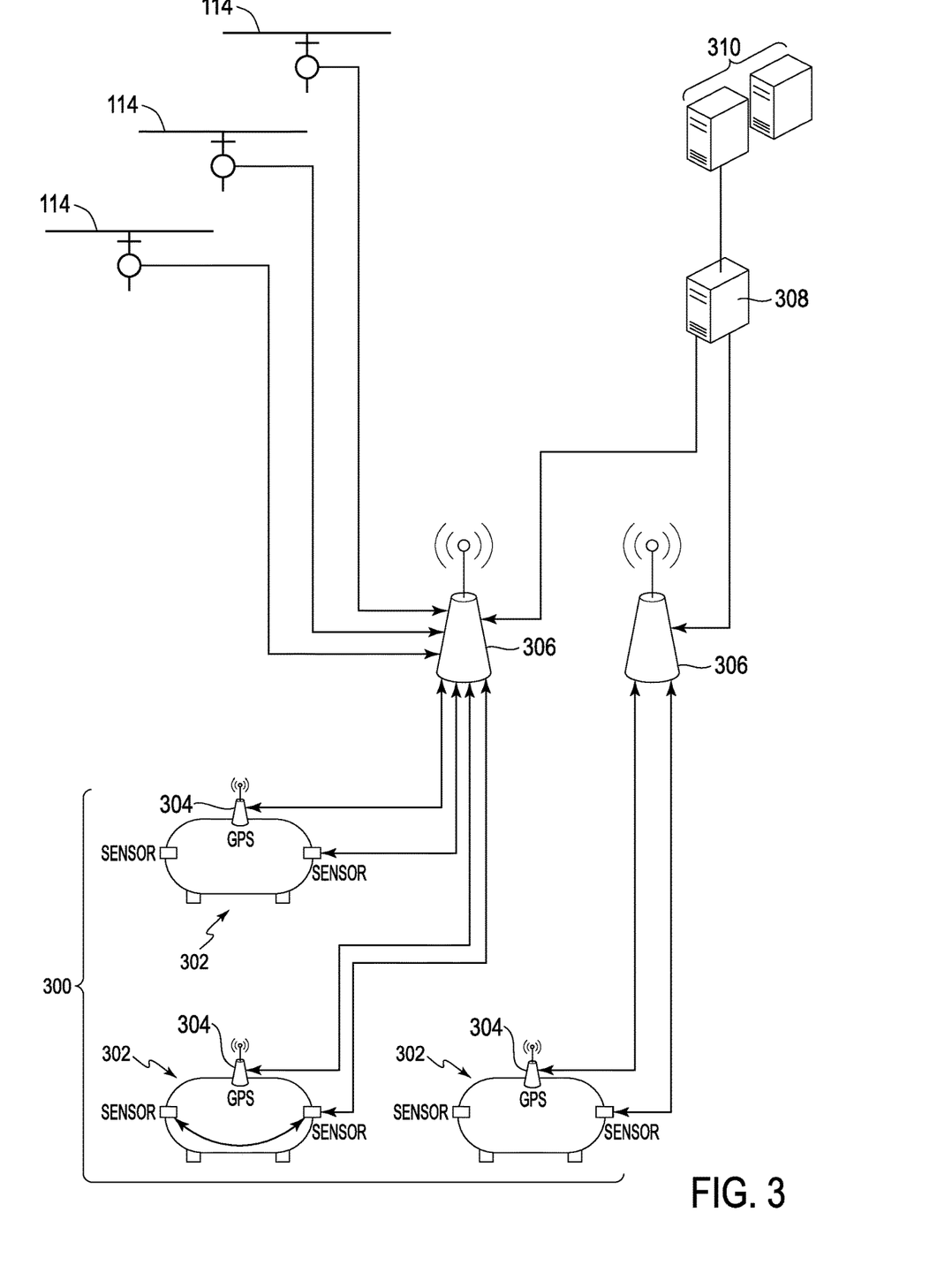
FIG. 3 is an illustration of a wireless sensor network.

The anticipatory collision avoidance system 200 may also include a wireless sensor network 300 as shown in FIG. 3. In various embodiments, the wireless sensor network 300 includes one or more receivers 208 and one or more sensors 204 (both shown in FIG. 2). In the illustrated embodiment, one or more sensor devices 302 are provided as described herein that communicate location information of the sensor devices 302, which correspond to the location of the object to which the sensor devices 302 are coupled. In operation, the sensor devices 302 capture location information, which in some embodiments, is provided by continuous monitoring of the location of the objects to which the sensor devices 302 are coupled and which information may be used to determine where the objects are likely going to be in the future.

In some embodiments, the sensor devices 302 include an RF sensor used to sense larger objects, such as larger metallic objects. The RF sensors are initially used for location determination and detection of other potential objects in proximity to the object being monitored. The sensor devices 302 also include a GPS device that may be used after RF sensor detection (an initial potential collision trigger) to then communication location information of the object. For example, the sensor devices 302 include a transmitter 304 that is configured to communicate with one or more wireless access points (WAPs) 306 that transmit the location information to a server 308. It should be noted that the server 308 may form part of or communicate with the anticipatory collision avoidance system 200, such as being part of the controller 206 (shown in FIG. 2). As described herein, a system configuration may be provided wherein the server 308 communicates with a CPS middleware operating on one or more processors 310 (e.g., CPUs).

In operation, the wireless sensor network 300 provides for communication of location and movement information of one or more of the objects 106 and individuals 110, which is processed by the anticipatory collision avoidance system 200 to identify potential collision locations. For example, interface/collision rules may be managed by the anticipatory collision avoidance system 200 and alerts determined by the server 308 and used to provide corresponding warnings. In some embodiments, one or more threshold rules may be defined to determine the distance at which a warning should be issued, which may be based on a number of different factors as discussed herein.

In some embodiments, one or more different inputs and outputs are provided for use in the anticipatory collision avoidance processes and by the systems described herein. For example, the anticipatory collision avoidance system 200 may receive as inputs, one or more of a Device/Appliance ID, sensor inputs (samples) from the sensor devices 302 (that are provided to the server 308) and location information, such as GPS position information. The inputs may then be processed by the anticipatory collision avoidance system 200, which may include processing the information as follows:

1. Determine sensor proximity levels;
2. Determine sensor warning levels;
3. Determine GPS position;
4. Compute previous position information;
5. Compute current position information;
6. Compute direction information (such as based on speed);
5. Compute proximity and anticipatory collision distance from the object 106 or individual 110 associated with sensor device 302 to another object 106 or individual 110 associated with another sensor device 302;
6. Automatically adjust frequency of sensor sample and GPS control cycle based on warning;
7. Control projection device 114 position; and
8. Generate one or more alerts.

The alerts may be delivered to the object 106 or individual 110 in various different ways, including, but not limited to by vibration, projection of sound and/or lights as described herein. Additionally, the alert may result in the complete shutdown (or stopping) or slowing down of one or more of the objects 106. The location at which the alerts are projected may be moved as the object 106 is moved, for example, by adjusting the position of the projection device 114 to move the projected alert (e.g., light/image) that is being projected on the factory floor as described herein.

Figure 4:
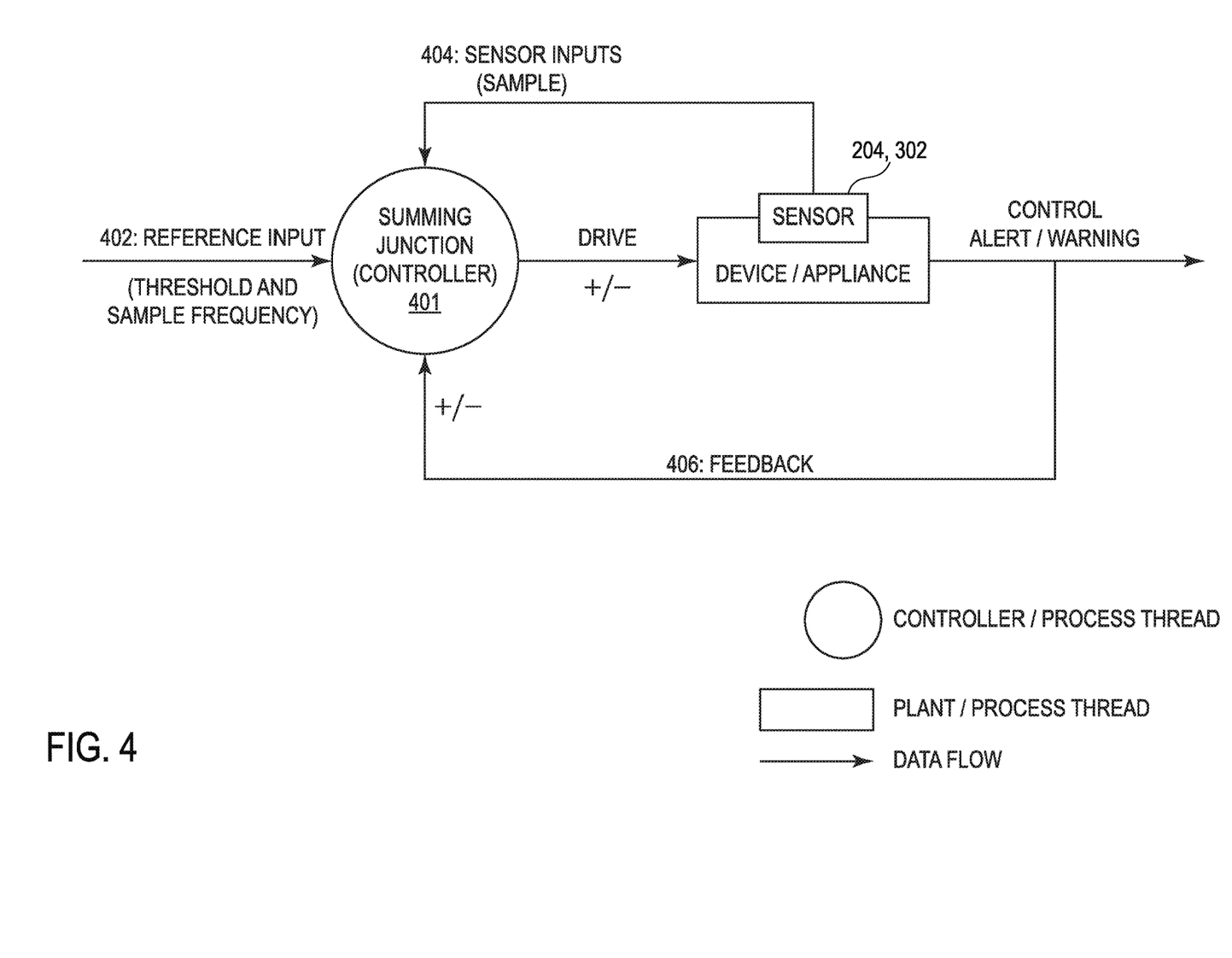
FIG. 4 is an illustration of a sensor feedback arrangement.

It should be noted that in various embodiments, the server 308, which may be a central server, runs the service or algorithms to provide the anticipatory collision avoidance in real-time or near real-time. For example, as shown in FIG. 4, illustrating a sensor feedback arrangement 400, continuous or dynamic sensor feedback may be provided. As illustrated in FIG. 4, a summing junction 401 receives as inputs a reference input 402 (e.g., a threshold and sample frequency), sensor information 404 (e.g., sensor samples) from the sensor 204 or sensing device 302 coupled with an device/appliance, such as the object 106 or individual 110, and feedback information 406 (e.g., control alert/warning feedback). The summing junction 401 may be programmed or implemented as part of the controller 206 (shown in FIG. 2).

Thus, in one or more embodiments, the anticipatory collision avoidance system 200 allows for providing alerts to prevent or reduce the likelihood that one or more objects 106 (e.g., an engine or forklift) or individuals 110 will impact each other. For example, in one or more embodiments, the anticipatory collision avoidance system 200 performs collision avoidance by identifying/determining the mass of the object 106, determining locations at time 1 and time 2 of the object 106, individuals 110 and other object of interest, such as in a determined proximity, determining velocity from location data, determining/computing anticipated separation distance for the moving object 106 based on the mass and velocity, determining a direction of travel of a movable object 106 and a potential intersection region of one or more movable objects (e.g., from an intersection of one or more direction of travel projections, radial safety zones around each object, etc.), and generating an output signal to an alarm device (such as the projection device 114) to provide an alert at the intersection region when at least one movable object 106 is within a predetermined separation distance.

Figure 5:
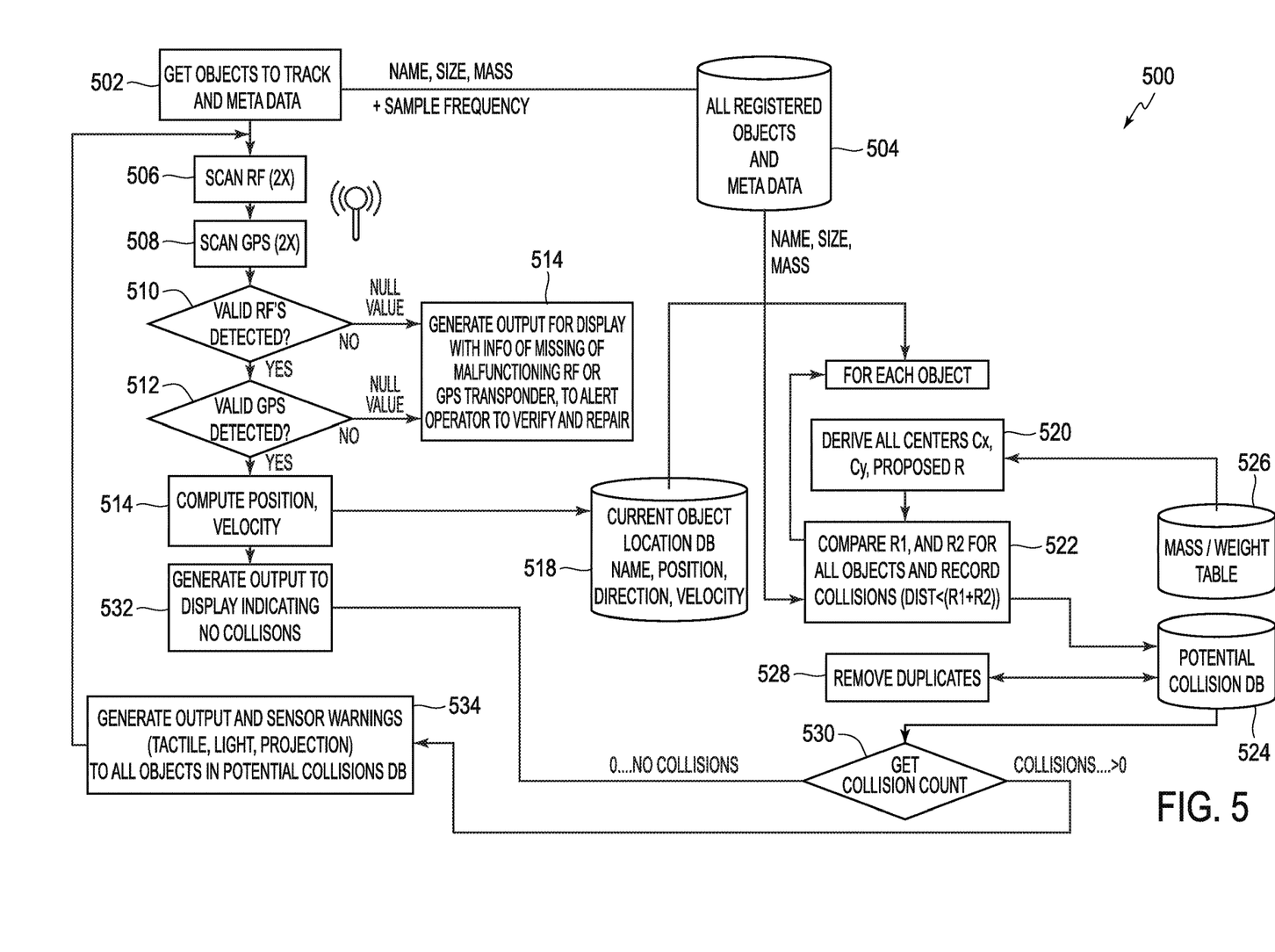
FIG. 5 is an illustration of a process for performing anticipatory collision avoidance.

More particularly, FIG. 5 illustrates a process 500 for performing anticipatory collision avoidance. It should be noted that the various steps in the process 500 may be performed in any order and additional or fewer steps may be provided. Also, one or more of the steps may be performed simultaneously, concurrently or sequentially. The process 500 may be implemented by one or more of the systems described herein.

The process includes determining one or more objects 106 to monitor or track at 502, including obtaining metadata corresponding to the objects(s) 106. For example, metadata may be associated with each of the objects 106 and registered in the anticipatory collision avoidance system 200. In some embodiments a database 504 (which may be embodied as or form part of the database 210 in FIG. 2) is accessed to obtain the information for one or more objects 106, including the name, size and mass of the object 106, as well as a defined sample frequency for the object 106, which may be based on the size and mass of the object 106.

The process 500 includes performing an RF scan at 506 to determine the relative proximity of objects 106, which is a coarse object location determination that may be used to determine if one or more objects 106 are in proximity to each other or an individual 110. The process also includes performing a GPS scan at 508 to determine specific location information for one or more the objects 106. For example, in some embodiments, after a determination is made based on the RF scan that two objects 106 or an object 106 and individual 110 are in proximity to each other (e.g., within 25 feet, 50 feet, 100 feet, etc.), which defines an initial collision detection condition, the GPS scan is performed to determine a more precise location of the objects 106 or individuals 110.

The process 500 further includes determining at 510 whether the RF information is valid and at 512 determining whether the GPS information is valid. For example, a validity check may be performed to determine whether the information is reliable. If valid information is not detected at 510 or 512, an output is generated at 514 for display indicating the missing information or malfunctioning RF or GPS transponder to alert an operator to verify the information or repair the malfunctioning device.

If valid RF and GPS information is received, a position and velocity of the object(s) 106 and/or individual(s) 110 is determined at 514. The determined information is stored in a database 516 (which may be embodied as or form part of the database 210 in FIG. 2), including, but not limited to, the current position or location of the object(s) 106 and/or individual(s) 110 with the associated name of the object(s) 106 and/or individual(s) 110, a direction of movement of the object(s) 106 and/or individual(s) 110 and velocity of the object(s) 106 and/or individual(s) 110.

The process 500 includes, for each object, deriving all center locations of the object(s) 106 and/or individual(s) 110 and a defined radius there around at 520. This step at 520 defines an anticipatory collision avoidance area around the object(s) 106 and/or individual(s) 110 (safety zone or radius), which if another object 106 and/or individual 110 is detected therein, a warning may be provided. For example, at 522, the radiuses of the object(s) 106 and/or individual(s) 110 are compared at 522 to determine if a predefined distance is less than the radius of one of the object(s) 106 and/or individual(s) 110 and another one of the object(s) 106 and/or individual(s) 110 in proximity thereto. This comparison information is stored in a database 524 (which may be embodied as or form part of the database 210 in FIG. 2) to determine potential collision conditions.

It should be noted that in the step 520, the determinations may be calculated based on mass/weight information, such as stored in a mass/weight table in a database 526. Additionally, with respect to the potential collision information determined at 522, duplicate information is removed at 528.

The process 500 includes determining a collision count at 530. For example, based on threshold values and the comparisons at 522, if no potential collisions are determined, then at 532 an output is generated to display an indication that there are no potential collisions. This displayed information may be used by an operator of equipment moving the object 106 to confirm that continued movement of the object 106 is in a safe movement zone. If one or more potential collisions are determined, then at 534 an output (e.g., output signal) is generated and a warning is provided as described herein (e.g., a tactile, visual or audible warning) to all objects 106 and individuals 110 in the potential collision area as stored in the database 524.

Figure 6A:
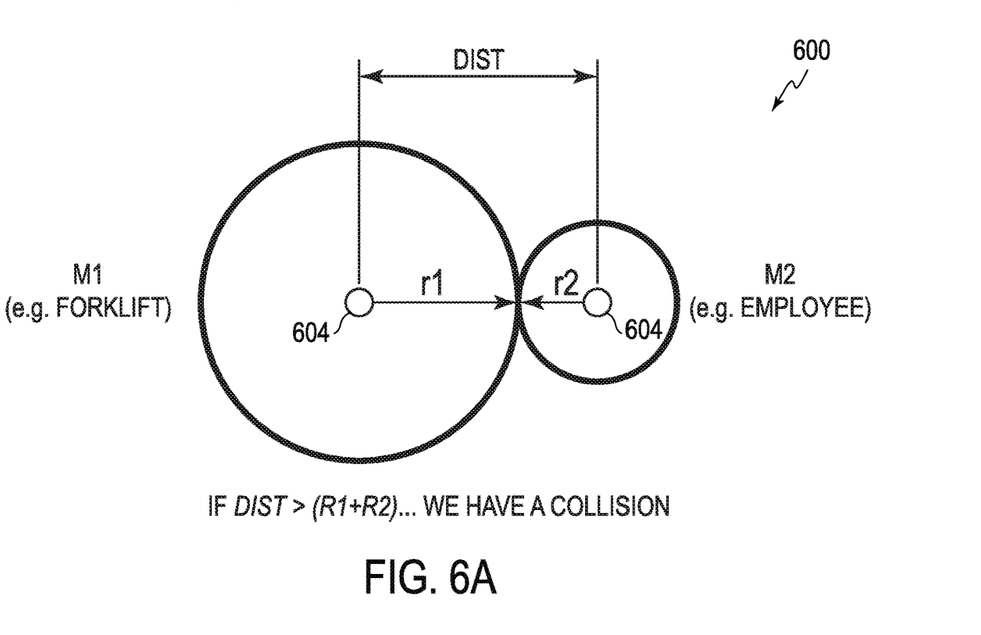
FIGS. 6A and 6B are illustrations of a table-driven implementation for performing anticipatory collision avoidance.
Figure 6B:
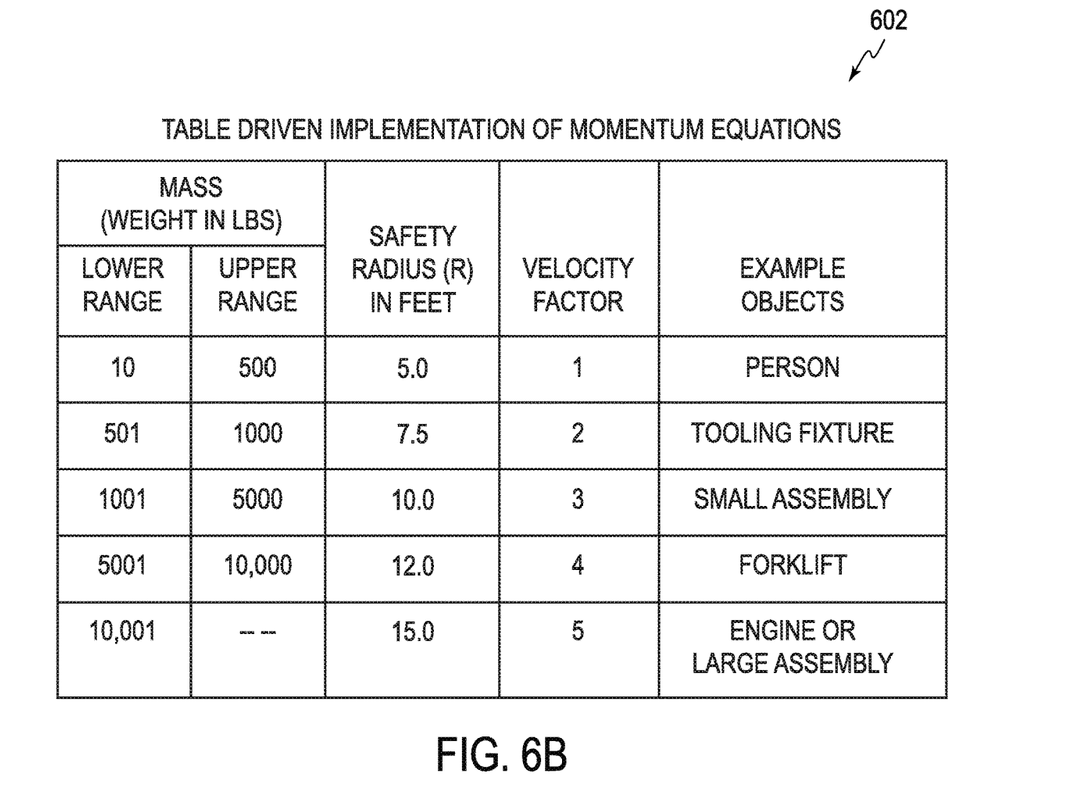

FIGS. 6A and 6B illustrate a table-driven implementation 600 of momentum equations that may be used in various embodiments, such as in the process 500. As can be seen in the table 602, a safety radius and velocity factor may be defined for different objects that fall within a range of mass. The information in the table 602 may be used by the process 500 to determine whether, based on the distance between centers 604 of an object 106 (illustrated as a forklift) and an individual 110 and the defined radius, a possible collision could occur and an alert should be issued. For example, a determination may be made as to whether there is an overlap of the safety regions of each of the objects 106 and individuals 110 defined by the safety radius (illustrated as r1 and r2).

Figure 7:
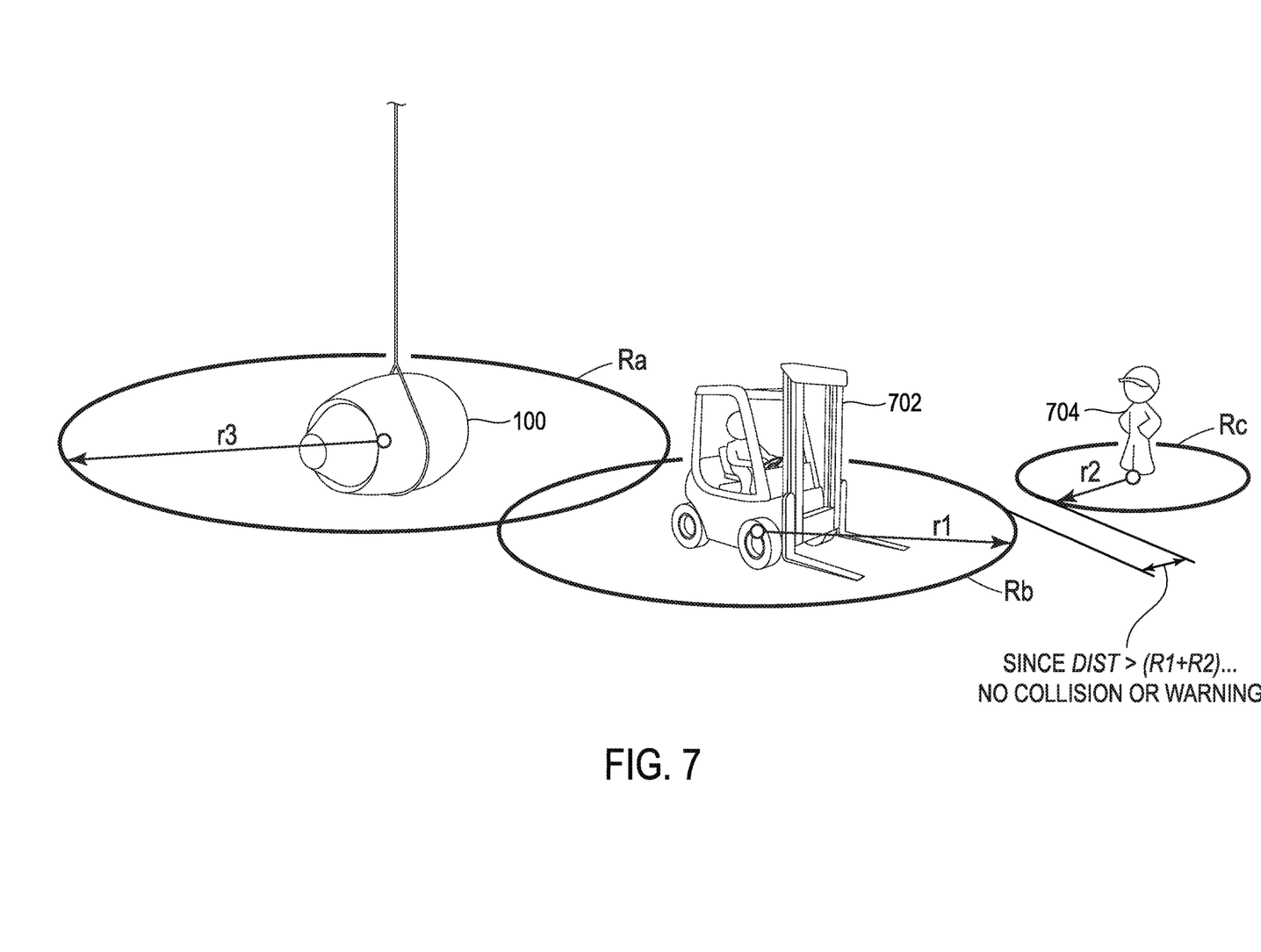
FIG. 7 is an illustration of performing anticipatory collision avoidance.

For example, as illustrated in FIG. 7, a determination is made whether the safety radiuses Ra, Rb or Rc, respectively, of an engine 700 (being moved by a crane), a forklift 702 and an individual 704, overlap. In the illustrated example, radius Ra and Rb overlap, but not Ra and Rc or Rb and Rc. Thus, a potential collision condition is determined between the engine 700 and forklift 702, such that an anticipatory collision avoidance alert is issued as discussed herein.

The various embodiments may be implemented in connection with different computing systems. Thus, while a particular computing or operating environment may be described herein, the computing or operating environment is intended to illustrate operations or processes that may be implemented, performed, and/or applied to a variety of different computing or operating environments.

The disclosure and drawing figure(s) describing the operations of the method(s) set forth herein should not be interpreted as necessarily determining a sequence in which the operations are to be performed. Rather, although one illustrative order is indicated, it is to be understood that the sequence of the operations may be modified when appropriate. Accordingly, certain operations may be performed in a different order or simultaneously. Additionally, in some aspects of the disclosure, not all operations described herein need be performed.

Figure 8:
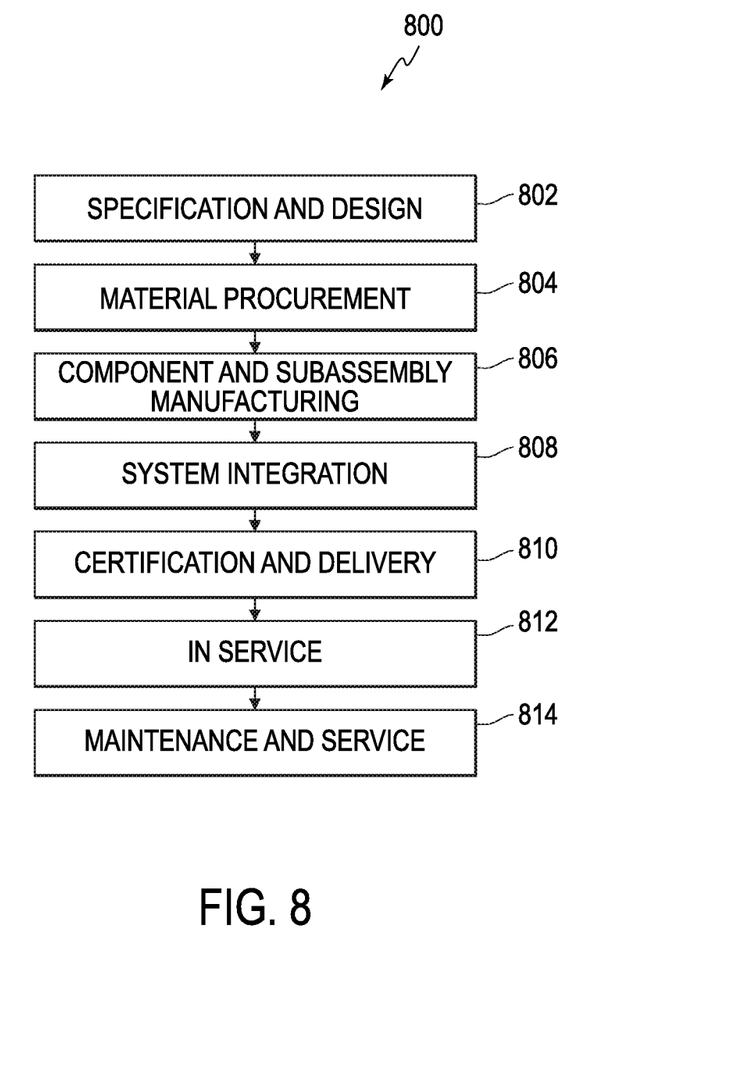
FIG. 8 is a block diagram of aircraft production and service methodology.
Figure 9:
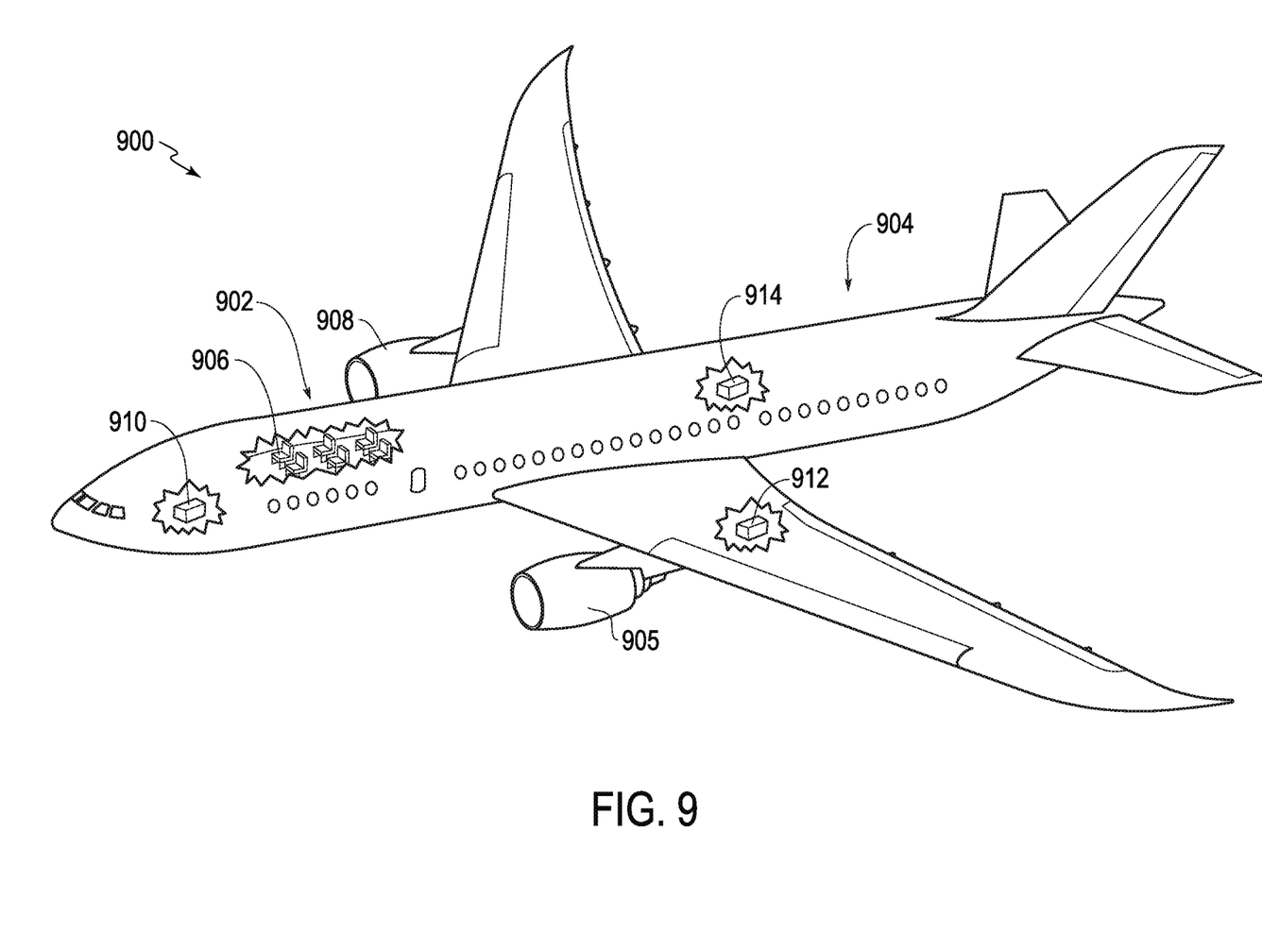
FIG. 9 is a schematic perspective view of an aircraft.

Examples of the disclosure may be described in the context of an aircraft manufacturing and service method 800 as shown in FIG. 8 and an aircraft 900 as shown in FIG. 9. During pre-production, illustrative method 800 may include specification and design 802 of the aircraft 900 and material procurement 804. During production, component and subassembly manufacturing 806 and system integration 808 of the aircraft 900 take place. Thereafter, the aircraft 900 may go through certification and delivery 810 to be placed in service 812. While in service by a customer, the aircraft 900 is scheduled for routine maintenance and service 814 (which may also include modification, reconfiguration, refurbishment, and so on).

Each of the processes of the illustrative method 800 may be performed or carried out by a system integrator, a third party, and/or an operator (e.g., a customer). For the purposes of this description, a system integrator may include, without limitation, any number of aircraft manufacturers and major-system subcontractors; a third party may include, without limitation, any number of vendors, subcontractors, and suppliers; and an operator may be an airline, leasing company, military entity, service organization, and so on.

As shown FIG. 9, the aircraft 900 produced by the illustrative method 800 may include an airframe 902 with a plurality of high-level systems 904 and an interior 906. Examples of high-level systems 904 include one or more of a propulsion system 908, an electrical system 910, a hydraulic system 912, and an environmental system 914. Any number of other systems may be included. Although an aerospace example is shown, the principles may be applied to other industries, such as the automotive industry.

Apparatus and methods shown or described herein may be employed during any one or more of the stages of the manufacturing and service method 800. For example, components or subassemblies corresponding to component and subassembly manufacturing 806 may be fabricated or manufactured in a manner similar to components or subassemblies produced while the aircraft 900 is in service. Also, one or more aspects of the apparatus, method, or combination thereof may be utilized during the production states 806 and 808, for example, by substantially expediting assembly of or reducing the cost of an aircraft 900. Similarly, one or more aspects of the apparatus or method realizations, or a combination thereof, may be utilized, for example and without limitation, while the aircraft 900 is in service, e.g., maintenance and service 814.

Different examples and aspects of the apparatus and methods are disclosed herein that include a variety of components, features, and functionality. It should be understood that the various examples and aspects of the apparatus and methods disclosed herein may include any of the components, features, and functionality of any of the other examples and aspects of the apparatus and methods disclosed herein in any combination, and all of such possibilities are intended to be within the spirit and scope of the present disclosure.

It should be noted that the various embodiments may be implemented in hardware, software or a combination thereof. The various embodiments and/or components, for example, the modules, or components and controllers therein, also may be implemented as part of one or more computers or processors or field-programmable gate arrays (FPGAs). The computer or processor or FPGA may include a computing device, an input device, a display unit and an interface, for example, for accessing the Internet. The computer or processor may include a microprocessor. The microprocessor may be connected to a communication bus. The computer or processor or FPGA may also include a memory. The memory may include Random Access Memory (RAM) and Read Only Memory (ROM). The computer or processor or FPGA further may include a storage device, which may be a hard disk drive or a removable storage drive such as an optical disk drive, and the like. The storage device may also be other similar means for loading computer programs or other instructions into the computer or processor.

As used herein, the terms "system," "subsystem," "circuit," "component," or "module" may include a hardware and/or software system that operates to perform one or more functions. For example, a module, circuit, component, or system may include a computer processor, controller, or other logic-based device that performs operations based on instructions stored on a tangible and non-transitory computer readable storage medium, such as a computer memory. Alternatively, a module, circuit, component, or system may include a hard-wired device that performs operations based on hard-wired logic of the device. The modules or circuits or components shown in the attached figures may represent the hardware that operates based on software or hardwired instructions, the software that directs hardware to perform the operations, or a combination thereof.

The block diagrams of embodiments herein illustrate various blocks labeled "circuit" or "module." It is to be understood that the circuits or modules may be implemented as hardware with associated instructions (e.g., software stored on a tangible and non-transitory computer readable storage medium, such as a computer hard drive, ROM, RAM, or the like) that perform the operations described herein. The hardware may include state machine circuitry hard wired to perform the functions described herein. Optionally, the hardware may include electronic circuits that include and/or are connected to one or more logic-based devices, such as microprocessors, processors, controllers, or the like. Optionally, the modules may represent processing circuitry such as one or more FPGAs, application specific integrated circuit (ASIC), or microprocessor. The circuit modules in various embodiments may be configured to execute one or more algorithms to perform functions described herein. The one or more algorithms may include aspects of embodiments disclosed herein, whether or not expressly identified in a flowchart or a method.

As used herein, the terms "software" and "firmware" are interchangeable, and include any computer program stored in memory for execution by a computer, including RAM memory, ROM memory, EPROM memory, EEPROM memory, and non-volatile RAM (NVRAN) memory. The above memory types are exemplary only, and are thus not limiting as to the types of memory usable for storage of a computer program.

As used herein, an element or step recited in the singular and proceeded with the word "a" or "an" should be understood as not excluding plural of said elements or steps, unless such exclusion is explicitly stated. Furthermore, references to "one embodiment" are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the various embodiments without departing from their scope. While the dimensions and types of materials described herein are intended to define the parameters of the various embodiments, the embodiments are by no means limiting and are exemplary embodiments. Many other embodiments will be apparent to those of skill in the art upon reviewing the above description. The scope of the various embodiments should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112, paragraph (f), unless and until such claim limitations expressly use the phrase "means for" followed by a statement of function void of further structure.

This written description uses examples to disclose the various embodiments, including the best mode, and also to enable any person skilled in the art to practice the various embodiments, including making and using any devices or systems and performing any incorporated methods. The patentable scope of the various embodiments is defined by the claims, and may include other examples that occur to those skilled in the art. Such other examples are intended to be within the scope of the claims if the examples have structural elements that do not differ from the literal language of the claims, or if the examples include equivalent structural elements with insubstantial differences from the literal languages of the claims.

What is claimed is:
1. A system comprising:
a plurality of sensors configured to transmit signals indicating a plurality of locations corresponding to a plurality of movable objects, each sensor of the plurality of sensors corresponding to a particular movable object of the plurality of movable objects;
a receiver configured to receive the signals; and
a controller in communication with the receiver, the controller configured to perform operations including:
determining a direction of travel of each movable object based on the signals;

determining an intersection region of at least two movable objects of the plurality of movable objects;

initiating movement of an alert device based on the intersection region, wherein the alert device is distinct from the at least two movable objects and the plurality of sensors, and wherein the alert device is not coupled to any of the at least two movable objects; and transmitting an output signal to the alert device when at least one movable object of the at least two movable objects is within a predetermined proximity distance of the intersection region, wherein the output signal causes the alert device to provide an alert.

2. The system of claim 1, wherein the alert device comprises a projection device configured as an illuminating device for projecting the alert as a lighted indicia at the intersection region, wherein the lighted indicia is projected at a plurality of portions of the intersection region, the plurality of portions including a first portion at a first end of the intersection region and a second portion at a second end of the intersection region, the first end opposite of the second end.

3. The system of claim 2, wherein the projection device is controlled by the controller to move as the intersection region moves responsive to a change in the intersection region caused by movement of the at least two movable objects.

4. The system of claim 2, wherein the lighted indicia comprises an alert message, and wherein the light indicia is projected on a floor.

5. The system of claim 1, further comprising a second alert device configured to generate an audible alert or a tactile alert when the at least one movable object is within the predetermined proximity distance of the intersection region.

6. The system of claim 1, further comprising a database defining a safety radius for each type of object of a plurality of types of objects, wherein the plurality of types of objects are defined based on a corresponding mass, and wherein the intersection region is determined based on a first safety radius of a first movable object of the at least two movable objects.

7. The system of claim 6, wherein the predetermined proximity distance corresponds to a second safety radius of a second movable object of the at least two movable objects, and wherein the controller is configured to generate the output signal to provide the alert when the first safety radius overlaps with the second safety radius.

8. The system of claim 1, wherein at least one of the two movable objects is a human.

9. The system of claim 1, wherein the plurality of sensors include at least one radio-frequency sensor and at least one global positioning system sensor.

10. A method comprising:

receiving, at a controller from a plurality of sensors, signals indicating a plurality of locations corresponding to a plurality of movable objects, each sensor of the plurality of sensors corresponding to a particular movable object of the plurality of movable objects;

determining, by the controller, a direction of travel of each movable object based on the signals;

determining, by the controller, an intersection region of at least two movable objects of the plurality of movable objects;

initiating movement of an alert device based on the intersection region, wherein the alert device is distinct from the at least two movable objects and the plurality of sensors, and wherein the alert device is not coupled to any of the at least two movable objects; and transmitting an output signal to the alert device when at least one movable object of the at least two movable objects is within a predetermined proximity distance of the intersection region, wherein the output signal causes the alert device to provide an alert.

11. The method of claim 10, further comprising emitting with a projection device a lighted indicia at the intersection region of the at least two movable objects.

12. The method of claim 11, further comprising moving the projection device in response to the intersection region moving as the movable objects move.

13. The method of claim 11, further comprising projecting the lighted indicia on a floor.

14. The method of claim 10, further comprising generating an audible or tactile alert when the at least one movable object is within the predetermined proximity distance of the intersection region.

15. The method of claim 10, further comprising identifying a safety radius for each movable object of the plurality of movable objects based on a corresponding mass, and wherein the intersection region is based on a corresponding safety radius for each of the two movable objects.

16. The method of claim 15, wherein the predetermined proximity distance corresponds to a particular safety radius of a first movable object of the at least two movable objects.

17. The method of claim 10, wherein a first movable object of the two movable objects is a person.

18. A non-transitory computer readable medium storing instructions that, when executed by a processor, cause the processor to perform operations comprising:

receiving, from a plurality of sensors, signals indicating a plurality of locations corresponding to a plurality of movable objects, each sensor of the plurality of sensors corresponding to a particular movable object of the plurality of movable objects;

determining a direction of travel of each movable object based on the signals;

determining an intersection region of at least two movable objects of the plurality of movable objects;

initiating movement of an alert device based on the intersection region, wherein the alert device is distinct from the at least two movable objects and the plurality of sensors, wherein the alert device is coupled to a structure, and wherein the alert device is not coupled to any of the at least two movable objects; and transmitting an output signal to the alert device when at least one movable object of the at least two movable objects is within a predetermined proximity distance of the intersection region, wherein the output signal causes the alert device to provide an alert.

19. The non-transitory computer readable medium of claim 18, wherein the intersection region includes a first intersection region and a second intersection region, the first intersection region determined to have a higher probability of a collision than the second intersection region, wherein the alert includes a first notification in the first intersection region and a second notification in the second intersection region.

20. The non-transitory computer readable medium of claim 19, wherein the first notification includes a first colored light projected onto the first intersection region, and wherein the second notification includes a second colored light projected onto the second intersection region.

* * * * *